United States Patent
Otake

(10) Patent No.: US 10,721,371 B2
(45) Date of Patent: Jul. 21, 2020

(54) IMAGE READING APPARATUS, IMAGE FORMING APPARATUS AND MANUFACTURING METHOD OF THE IMAGE READING APPARATUS

(71) Applicant: CANON KABUSHIKI KAISHA, Tokyo (JP)

(72) Inventor: Akira Otake, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/279,112

(22) Filed: Feb. 19, 2019

(65) Prior Publication Data
US 2019/0268495 A1    Aug. 29, 2019

(30) Foreign Application Priority Data

Feb. 28, 2018  (JP) ................................. 2018-035076

(51) Int. Cl.
*H04N 1/04* (2006.01)
*H04N 1/028* (2006.01)
*G03G 15/23* (2006.01)
*H04N 1/024* (2006.01)

(52) U.S. Cl.
CPC ......... *H04N 1/02835* (2013.01); *G03G 15/23* (2013.01); *H04N 1/0249* (2013.01)

(58) Field of Classification Search
None
See application file for complete search history.

(56) References Cited

U.S. PATENT DOCUMENTS

| 10,187,541 B2 * | 1/2019 | Takahashi | H04N 1/19589 |
| 2006/0008295 A1 * | 1/2006 | Kohchi | H04N 1/028 399/144 |
| 2010/0129116 A1 | 5/2010 | Shinkawa | 399/200 |
| 2010/0232834 A1 * | 9/2010 | Ishida | H04N 1/02815 399/144 |
| 2010/0277775 A1 * | 11/2010 | Tochigi | H04N 1/02815 358/475 |
| 2011/0228353 A1 * | 9/2011 | Okamoto | H04N 1/02815 358/475 |
| 2012/0133994 A1 | 5/2012 | Yamasaki et al. | 358/296 |
| 2012/0300271 A1 * | 11/2012 | Ishida | G02B 6/0046 358/475 |
| 2013/0070312 A1 * | 3/2013 | Saiga | H04N 1/02855 358/474 |

(Continued)

FOREIGN PATENT DOCUMENTS

JP   2013251722 A   * 12/2013

*Primary Examiner* — Cheukfan Lee
(74) *Attorney, Agent, or Firm* — Venable LLP

(57) ABSTRACT

An image reading apparatus includes a substrate, a light guiding member, an image reading portion, and a supporting member. The light guiding member has a first contact surface and a second contact surface. The supporting member has a third contact surface supporting the first contact surface and a fourth contact surface supporting the second contact surface. In a cross section crossing the longitudinal direction, at least one of the first contact surface of the light guiding member and the third contact surface of the supporting member is a curved surface. In the cross section crossing the longitudinal direction, at least one of the second contact surface of the light guiding member and the fourth contact surface of the supporting member is a curved surface.

11 Claims, 13 Drawing Sheets

(56) References Cited

U.S. PATENT DOCUMENTS

| | | | | |
|---|---|---|---|---|
| 2013/0135859 A1* | 5/2013 | Inoue | ............... | G02B 6/0011 362/235 |
| 2013/0258420 A1* | 10/2013 | Nakaie | ............... | G03G 15/5062 358/474 |
| 2013/0278975 A1* | 10/2013 | Murakami | ......... | H04N 1/02855 358/484 |
| 2013/0321879 A1* | 12/2013 | Takahashi | ............ | G02B 6/0088 358/474 |
| 2015/0381848 A1* | 12/2015 | Matsui | ................ | H04N 1/0281 358/482 |
| 2016/0352955 A1* | 12/2016 | Ishida | ................... | G03G 15/50 |
| 2017/0264770 A1* | 9/2017 | Iwamatsu | .......... | H04N 1/02835 |
| 2017/0272598 A1* | 9/2017 | Suga | ................. | H04N 1/02855 |

* cited by examiner (a)

(b)

(a)

(b)

IMAGE READING APPARATUS, IMAGE FORMING APPARATUS AND MANUFACTURING METHOD OF THE IMAGE READING APPARATUS

FIELD OF THE INVENTION AND RELATED ART

The present invention relates to an image recording apparatus for reading an image on a sheet, an image forming apparatus including the image recording apparatus and a manufacturing method of the image recording apparatus.

In general, an image forming apparatus such as a copying machine or a facsimile machine includes an image recording apparatus for optically reading an image of an original. The image recording apparatus includes an illumination device in which a plurality of LEDs (point sources of light) are linearly arranged for illuminating the original with light. In the case where the plurality of LEDs are used as a light source, in order to suppress distribution non-uniformity of illuminance with respect to an LED arrangement direction when the original is illuminated with the light emitted from the light source, the illumination device is provided with a light guiding member made of a transparent resin material, glass or the like. The light guiding member guides the light, which is emitted from the light source and which diffuses, toward the original along a main scanning direction (LED arrangement direction) during reading of the original.

A position where the original is illuminated with the light is determined depending on a position (attitude) of the light guiding member. That is, when a variation in accuracy of positioning of the light guiding member occurs, the position where the original is illuminated with the light fluctuates. As a result, improper illumination occurs, so that there is a liability that unclearness of a read image due to an insufficient light amount and blur of the read image due to a fluctuation in optical path length occur. For this reason, in order to perform image reading with high accuracy, there is a need to enhance the accuracy of positioning of the light guiding member.

Conventionally, an image recording apparatus in which a light guiding plate is fixed by positioning the light guiding plate relative to a receiving table by a positioning pin and then by sandwiching the light guiding plate by a cover covering the light guiding plate from above and the receiving table has been proposed (U.S. Patent Application Publication US 2010/0129116 A1). Further, an image recording apparatus in which a circuit board including a light emitting element is mounted on a base plate with a screw or the like and a light guiding member is positioned relative to the above plate by an elastic plate mounted to the base plate has been proposed (US 2012/0133994 A1).

However, in the image recording apparatus disclosed in US 2010/0129116 A1, the light guiding plate is sandwiched by two members consisting of the cover and the receiving table, and therefore, the number of component parts for positioning the light guiding plate is large, so that the image recording apparatus is susceptible to component dimension tolerance. Further, arrangement of the positioning pin formed integrally with the light guiding plate and a hole for a pin formed in the receiving table is set during manufacturing, and thus positional adjustment of the light guiding plate cannot be performed in a state in which the positioning pin of the light guiding plate is inserted into the hole for the pin, so that a variation in position of the light guiding plate cannot be corrected.

Further, in the image recording apparatus disclosed in US 2012/0133994 A1, the circuit board is interposed between the base plate and the light guiding member, and therefore, a dimensional tolerance of the circuit board has the influence on positioning accuracy of the light guiding member. Further, positional adjustment of the light guiding member cannot be performed.

SUMMARY OF THE INVENTION

A principal object of the present invention is to provide an image recording apparatus capable of easily performing positional adjustment of a light guiding member.

Another object of the present invention is to provide an image forming apparatus including the image recording apparatus and a manufacturing method of the image recording apparatus.

According to an aspect of the present invention, there is provided an image reading apparatus comprising: a substrate on which a light source is provided; a light guiding member configured to guide light emitted from the light source; an image reading portion configured to read image information of a sheet, on which the light emitted from the light source and guided by the light guiding member is reflected, on the basis of reflected light from the sheet; and a supporting member configured to support the light guiding member, wherein the light guiding member has a first contact surface and a second contact surface provided at a position different from a position of the first contact surface with respect to a longitudinal direction of the substrate, wherein the supporting member has a third contact surface configured to support the first contact surface and a fourth contact surface which is configured to support the second contact surface and which is provided at a position different from a position of the third contact surface with respect to the longitudinal direction, wherein in a cross section crossing the longitudinal direction, at least one of the first contact surface of the light guiding member and the third contact surface of the supporting member is a curved surface, and wherein in the cross section crossing the longitudinal direction, at least one of the second contact surface of the light guiding member and the fourth contact surface of the supporting member is a curved surface.

Further features of the present invention will become apparent from the following description of exemplary embodiments with reference to the attached drawings.

Figure 5:
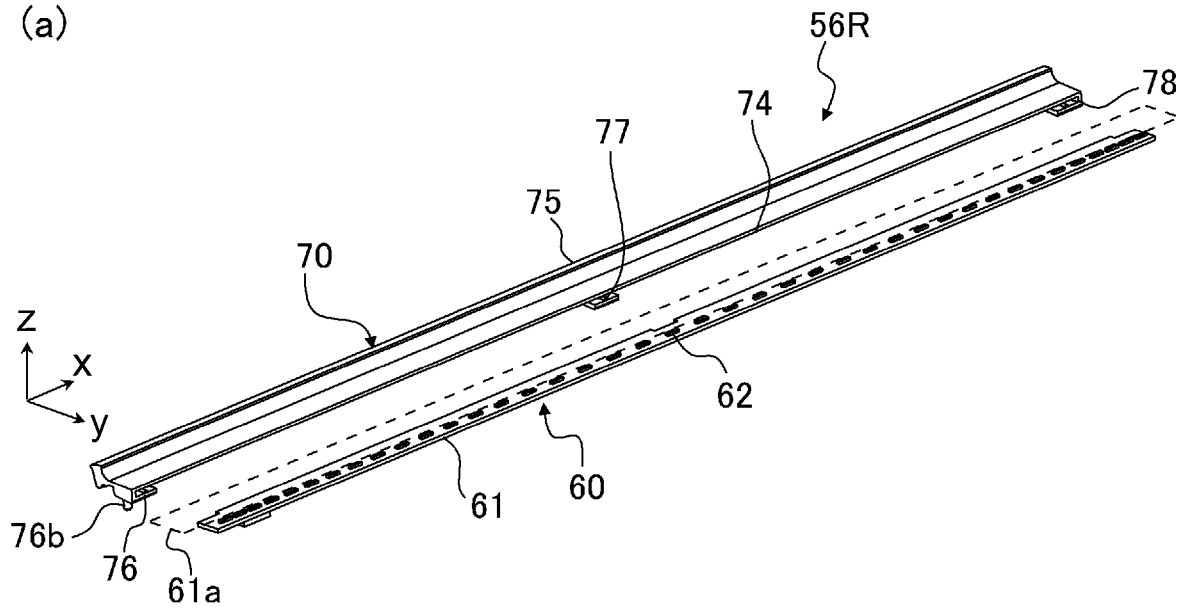
Figure 5:
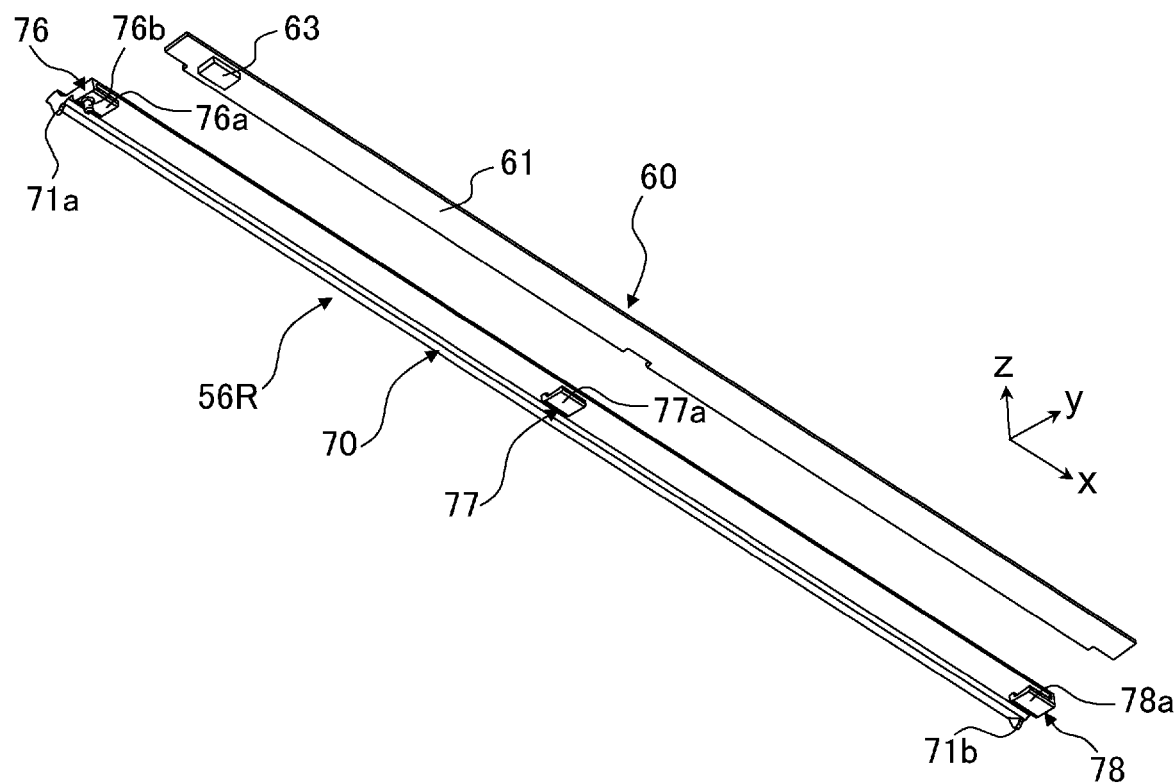

Part (a) of FIG. 5 is an exploded perspective view of a light guiding unit seen from above, and part (b) of FIG. 5 is an exploded perspective view of the light guiding unit seen from below.

Figure 6:
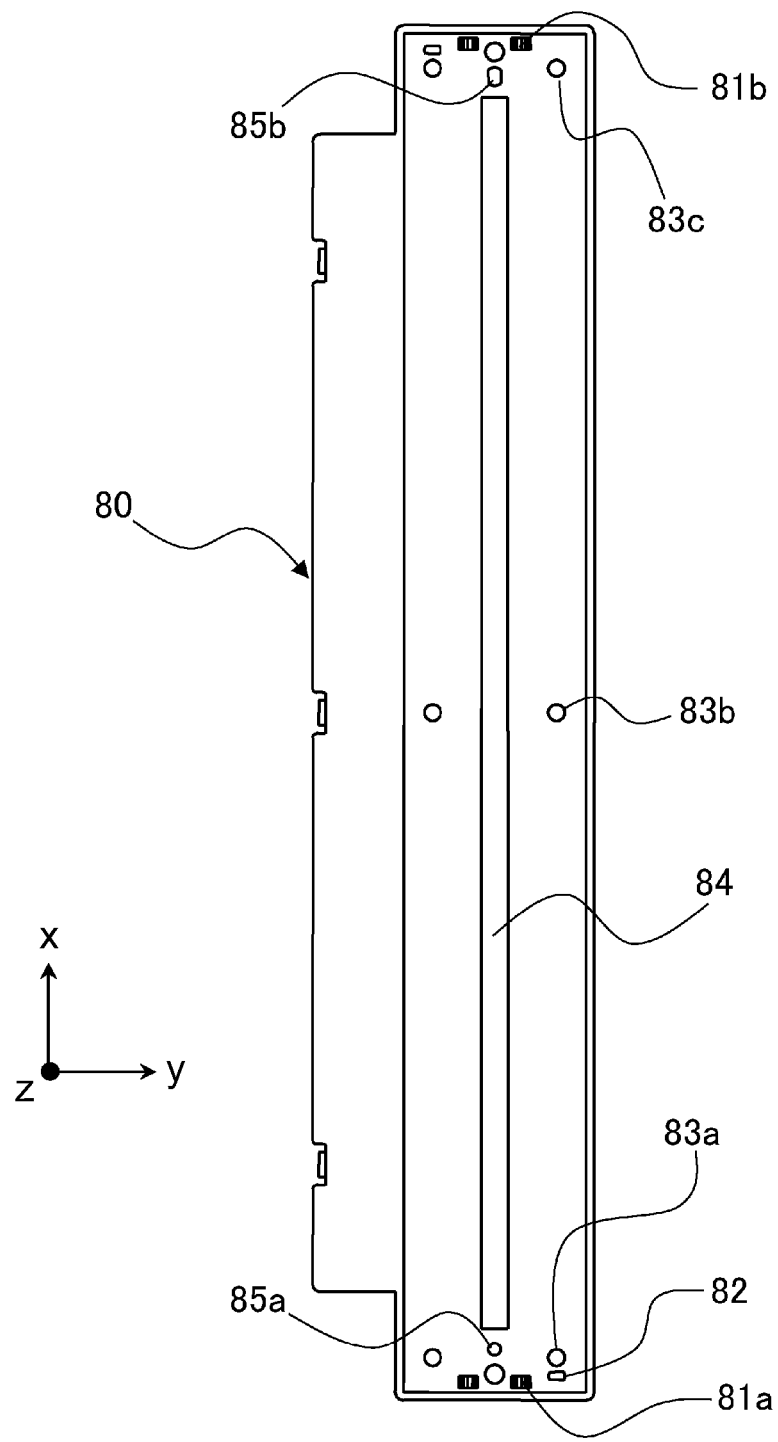

FIG. 6 is a top plan view showing a base portion.

Figure 7:
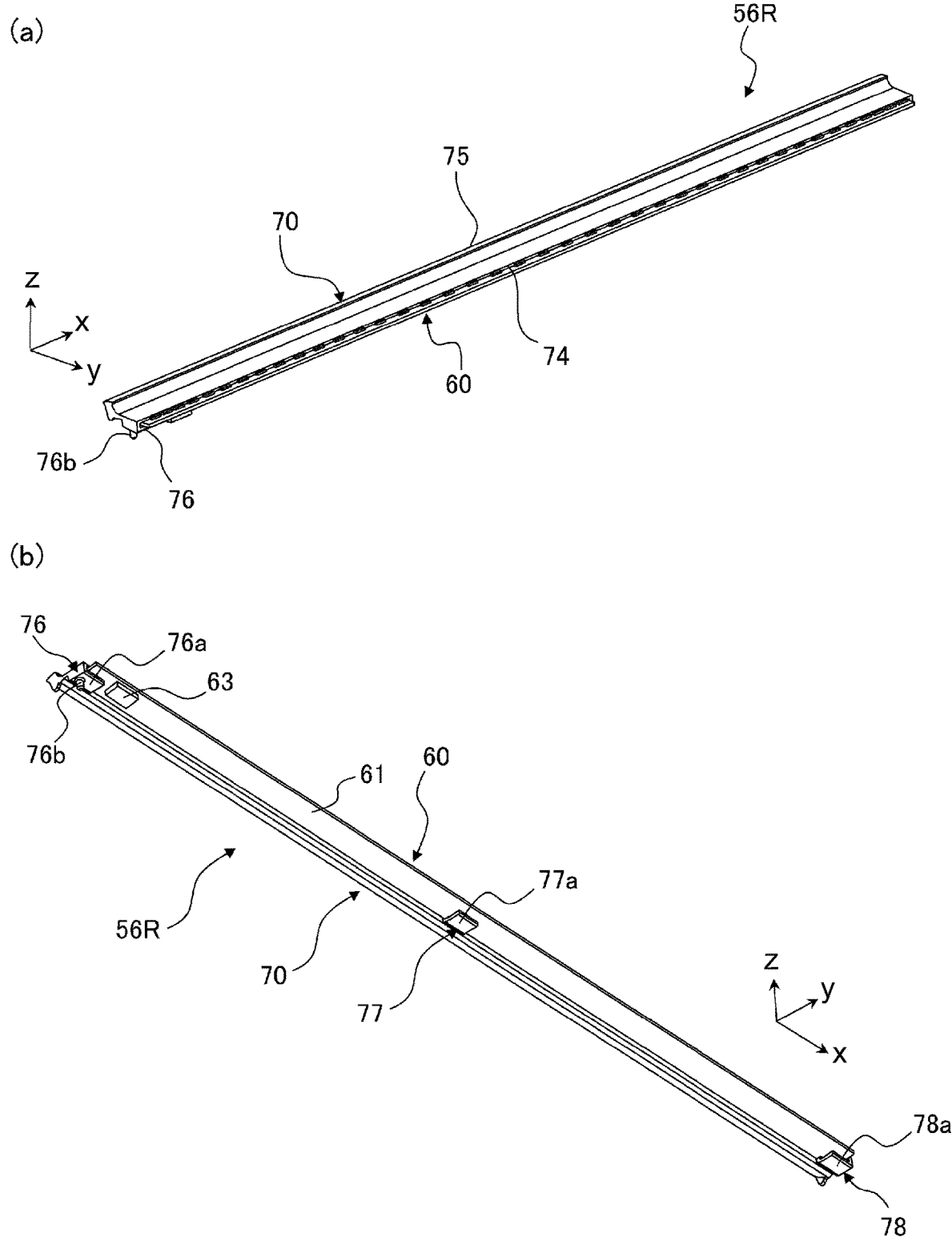

Part (a) of FIG. 7 is a perspective view of the light guiding unit seen from above, and part (b) of FIG. 7 is a perspective view of the light guiding unit seen from below.

Figure 8:
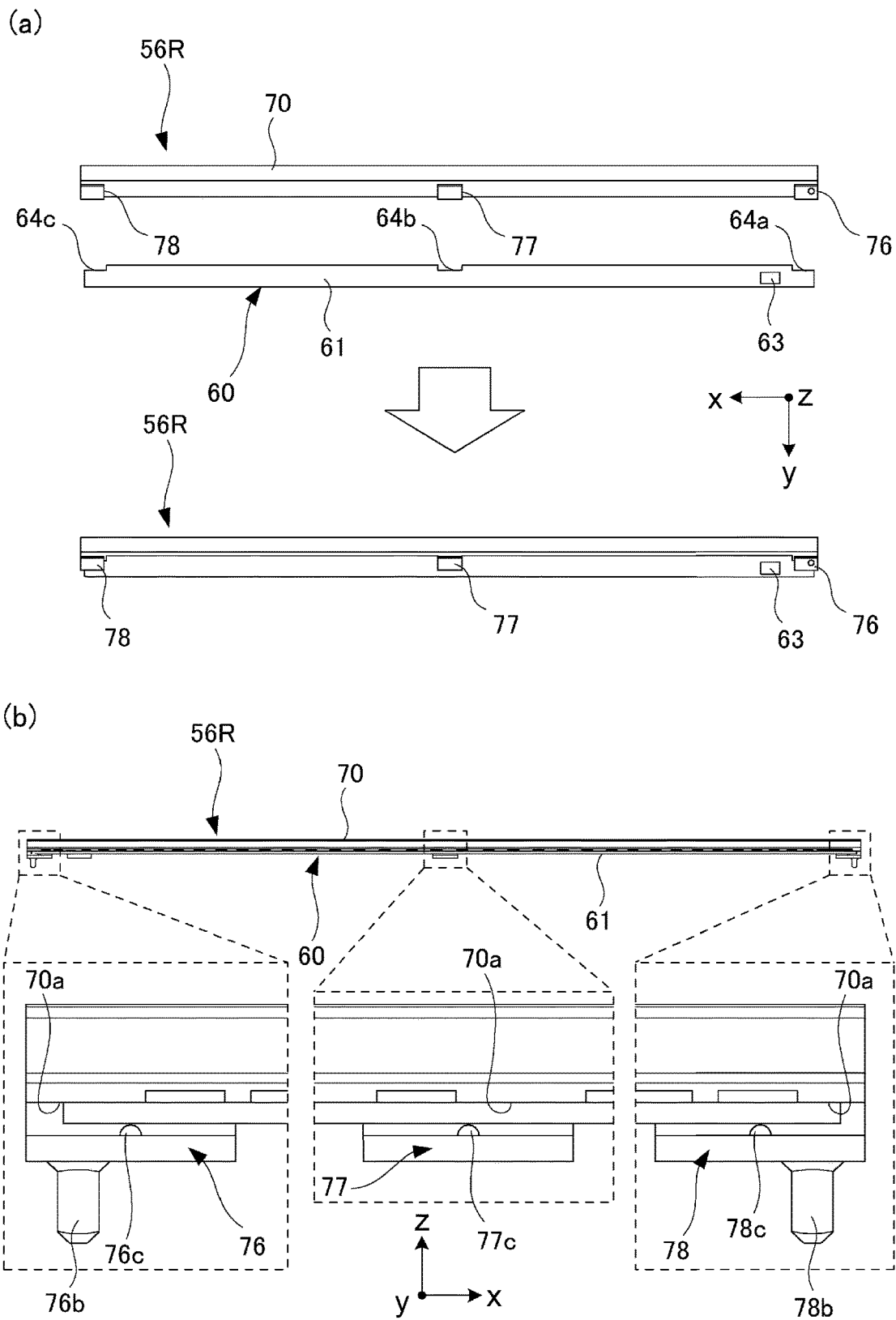

Part (a) of FIG. 8 is a bottom view showing a state in which an LED substrate is assembled with a light guide, and part (b) of FIG. 8 is a front view and an enlarged front view, showing a state in which the LED substrate is sandwiched by a slot portion.

Figure 9:
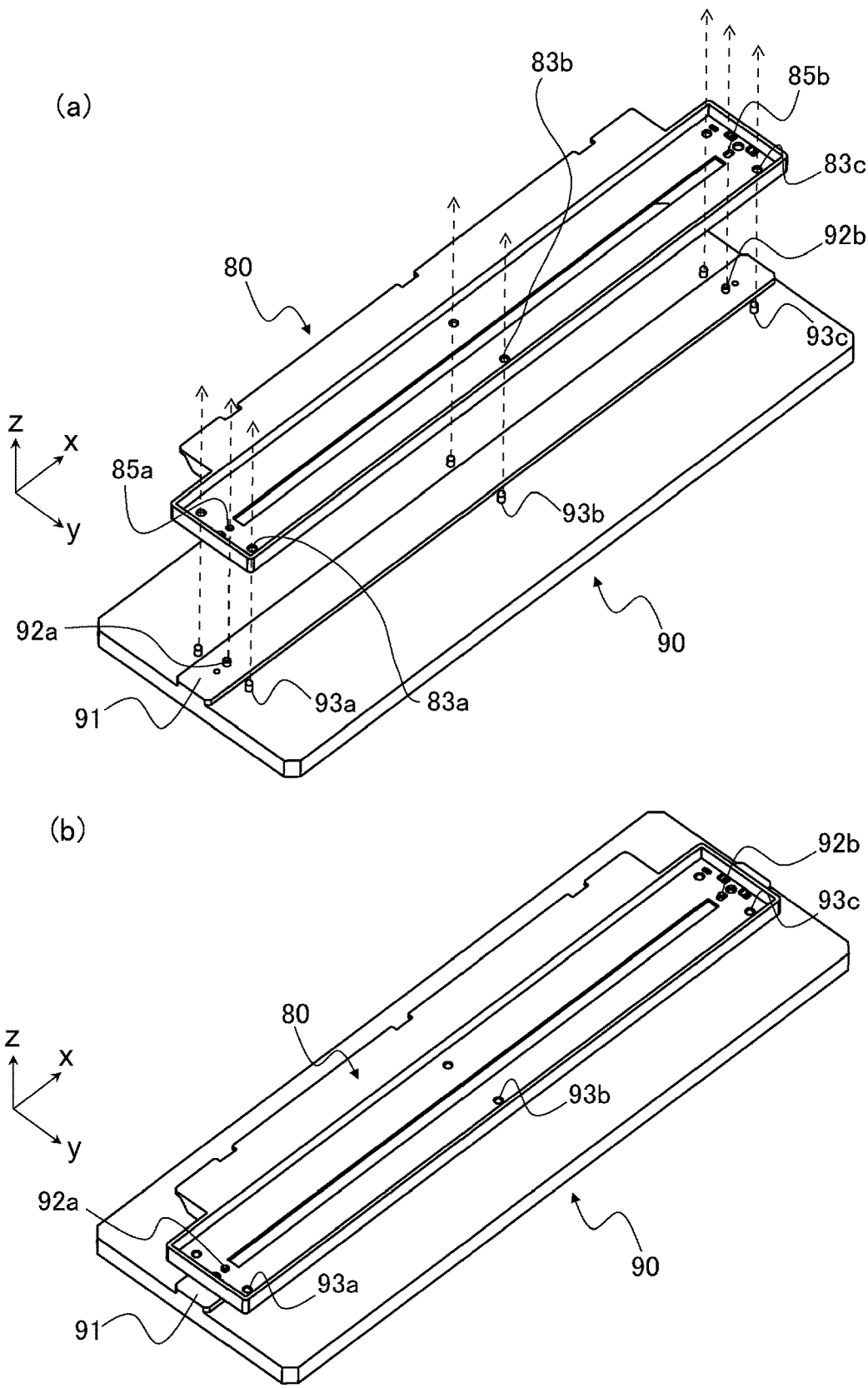

Part (a) of FIG. 9 is an exploded perspective view showing an assembling tool and the base portion, and part (b) of FIG. 9 is a perspective view showing a state in which the base portion is fixed to the assembling tool.

Figure 10:
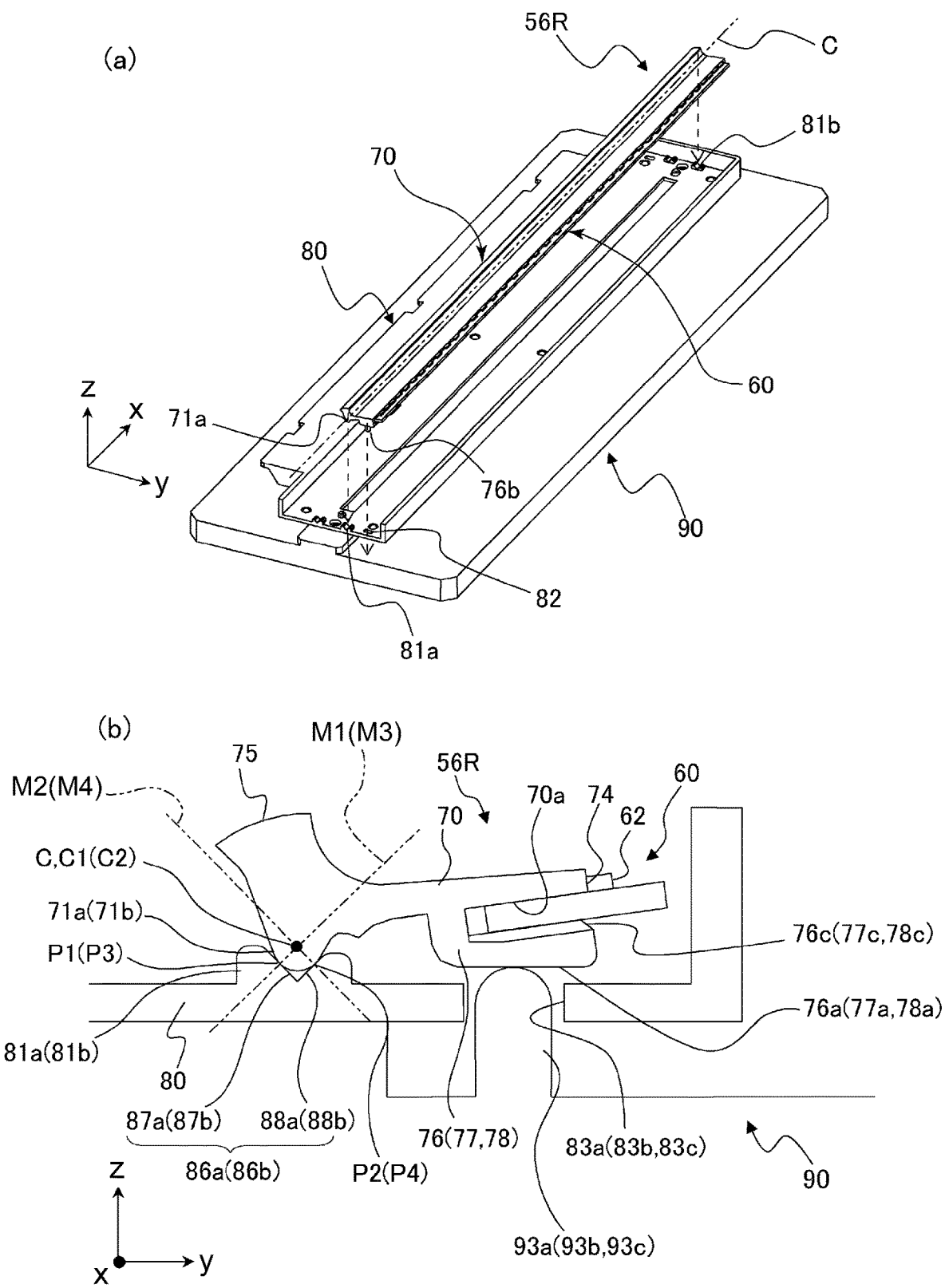

Part (a) of FIG. 10 is an exploded perspective view showing the light guide and the base portion, and part (b) of FIG. 10 is a sectional view showing the light guide, the base portion and an adjusting pin.

Figure 11:
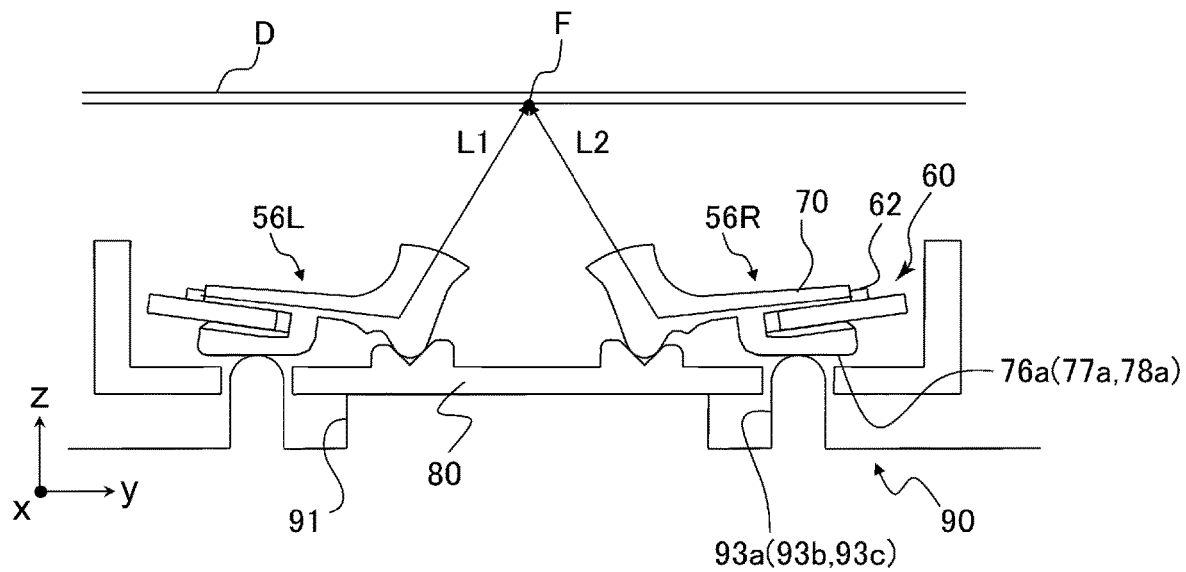
Figure 11:
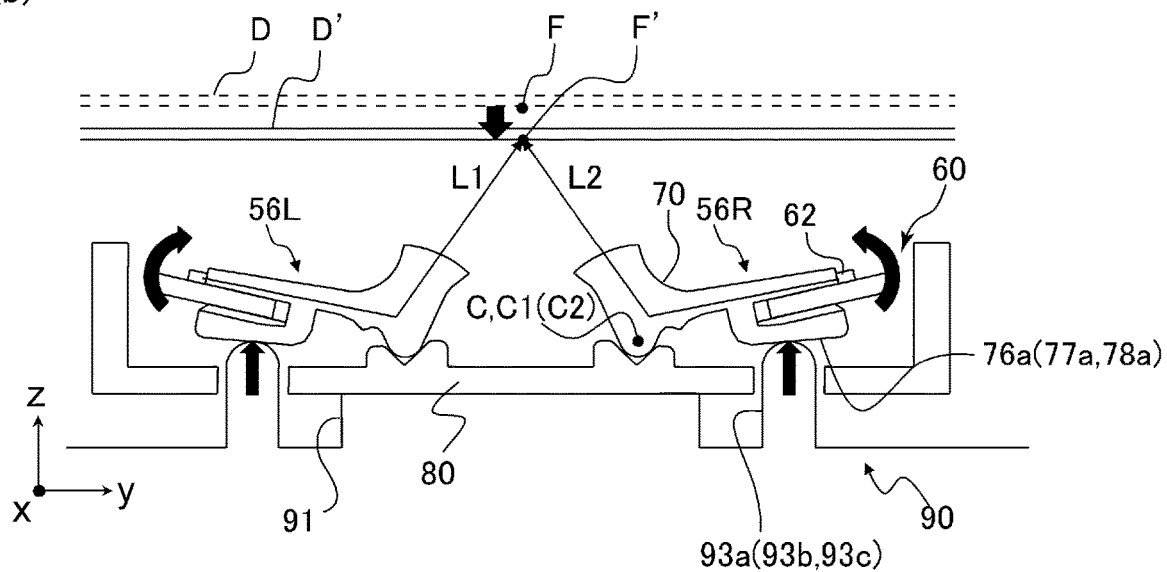

Part (a) of FIG. 11 is a sectional view of the light guiding unit when a position of illumination of light is set at an illumination position F, and part (b) of FIG. 11 is a sectional view of the light guiding unit when the position of illumination of light is set at an illumination position F'.

Figure 12:
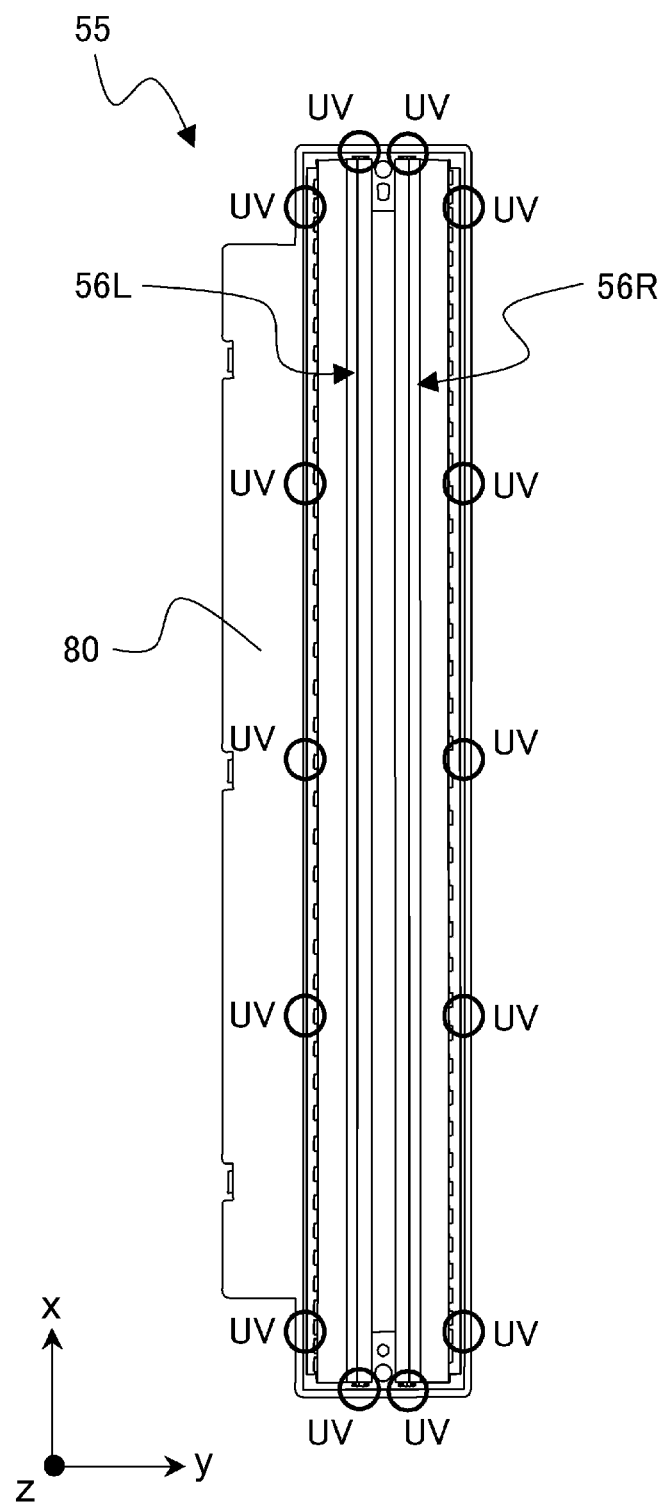

FIG. 12 is a top plan view showing portions where the light guide and the LED substrate are bonded to the base portion with an ultraviolet (UV) adhesive.

Figure 13:
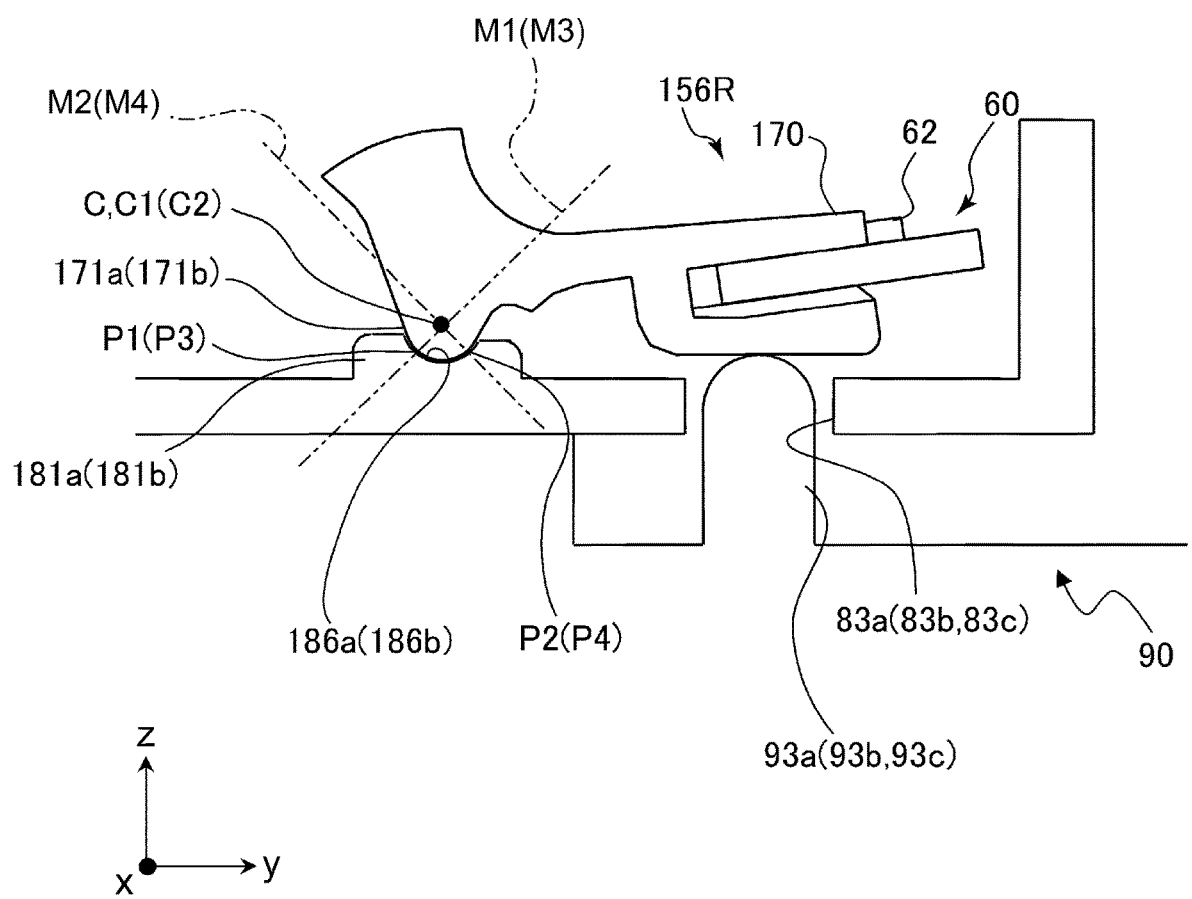

FIG. 13 is a sectional view showing a light guide, a base portion and an adjusting pin according to Second Embodiment.

Figure 14:
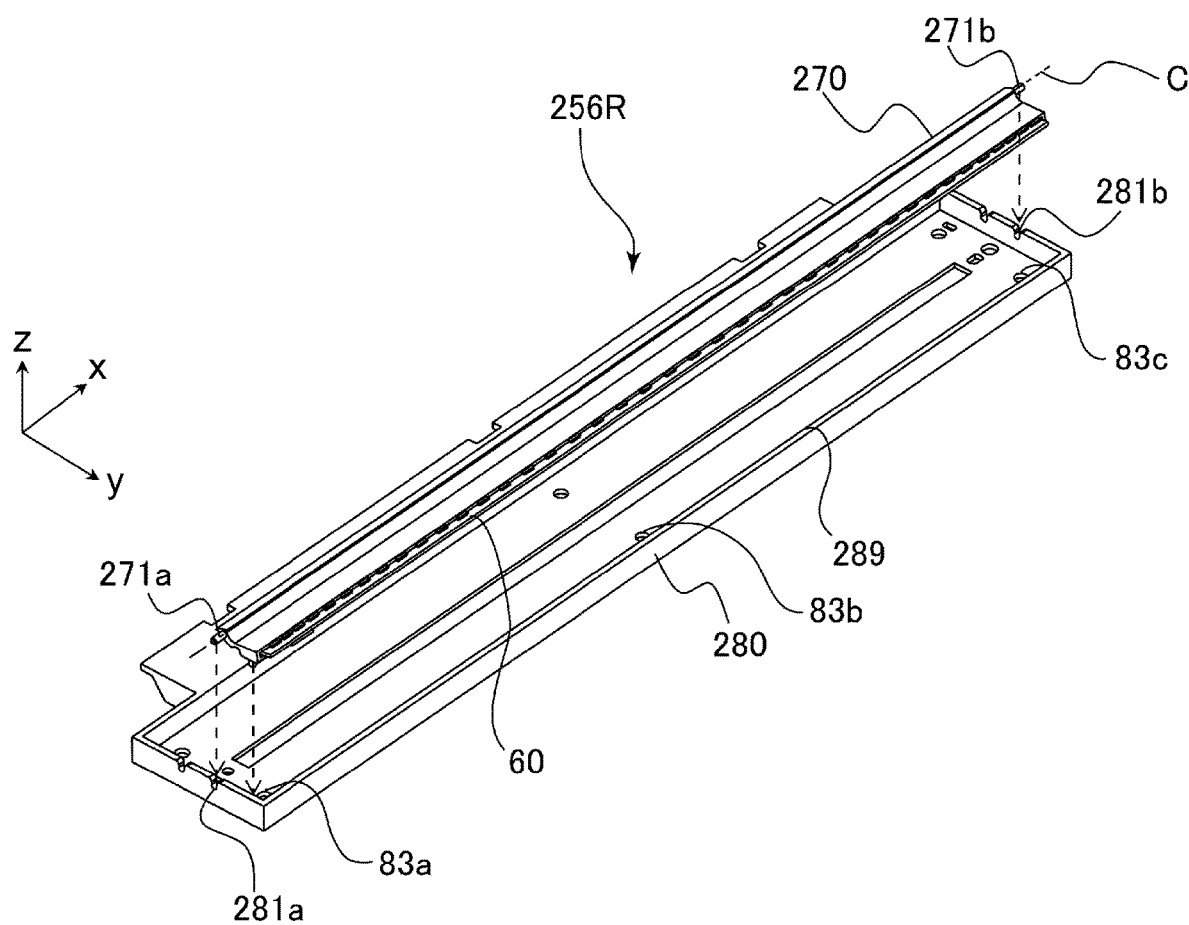

FIG. 14 is a perspective view showing a light guiding unit and a base portion according to Third Embodiment.

DESCRIPTION OF EMBODIMENTS

First Embodiment

An image recording apparatus and an image forming apparatus according to the present invention will be described with reference to the drawings. Incidentally, dimensions, materials, shapes, relative arrangement and the like of constituent elements described in the following embodiments are not intended such that the scope of the present invention is limited only thereto unless otherwise specified.

[General Structure of Printer]

Figure 1:
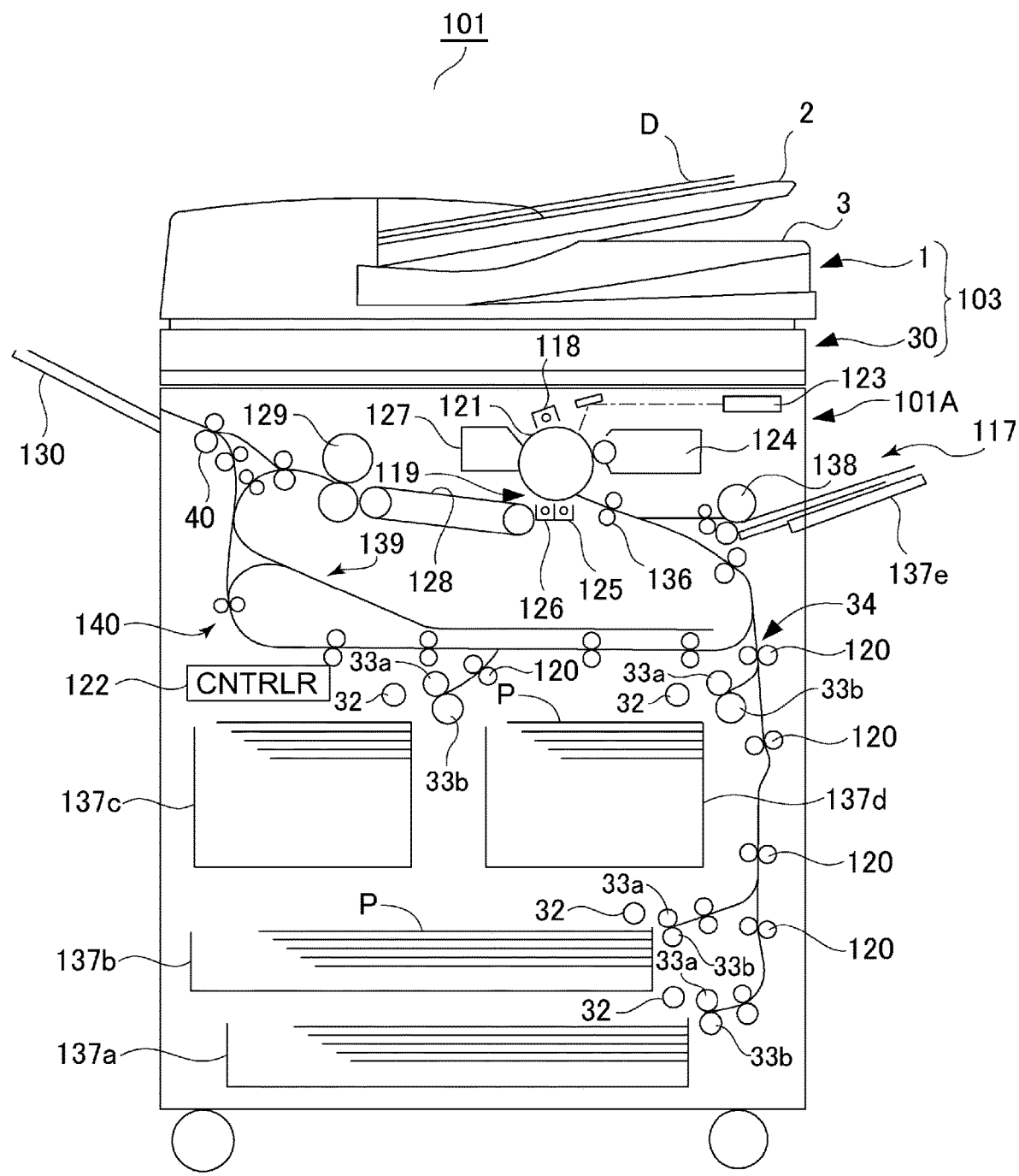
FIG. 1 is a schematic view showing a general structure of a printer according to First Embodiment.

A general structure of a printer 101 as an image forming apparatus will be described with reference to FIG. 1. The printer 101 includes a printer main assembly 101A and an image recording apparatus 103 as shown in FIG. 1. The image recording apparatus 103 provided on the printer main assembly 101A includes a reading unit 30 and an ADF 1 as described specifically later and reads image information by optically scanning an original D. The original D is a sheet including paper such as a sheet or an envelope, a plastic film such as a sheet for an overhead projector (OHT), a cloth, or the like. The image information converted into an electrical signal by the image recording apparatus 103 is transferred to a controller 122 provided in the printer main assembly 101A. Incidentally, in this embodiment, a front surface side of the image forming apparatus when a user (operator) stands so as to face an operating panel (not shown) for operating the printer 101 is defined as a front side, and a rear surface side of the image forming apparatus is defined as a rear side.

The printer main assembly 101A includes an image forming portion 119 for forming an image on a sheet P which is a recording material (medium), a sheet feeding portion 34 for feeding the sheet P to the image forming portion 119, and a manually feeding portion 17. The sheet feeding portion 34 includes sheet accommodating portions 137a, 137b, 137c and 137d capable of accommodating sheets different in size from each other. The sheets accommodated in each of the sheet accommodating portions are fed by a pick-up roller 32 and separated one by one by a feed roller 33a and a retard roller 33b, and then is delivered to a corresponding feeding roller pair 120. Then, the sheet P is successively delivered to a plurality of feeding roller pairs 120 provided along a sheet feeding path, and then is fed toward a registration roller pair 136.

Incidentally, the sheet P placed on a manual feeding tray 137e of the manually feeding portion 117 by the user is fed to an inside of the printer main assembly 101A by a feeding roller 138 and then is fed toward the registration roller pair 136. The registration roller pair 136 not only corrects oblique movement of the sheet P by stopping a leading end of the sheet P but also resumes feeding of the sheet P in synchronism with progress of an image forming operation which is a toner image forming process by the image forming portion 119.

The image forming portion 119 for forming the image on the sheet P is a unit of an electrophotographic type in which a photosensitive drum 121 which is a photosensitive member. The photosensitive drum 121 is rotatable along a feeding direction of the sheet P, and at a periphery of the photosensitive drum 121, a charger 118, an exposure device 123, a developing device 124, a transfer charger 125, a separation charger 126 and a cleaner 127 are provided. The charger 118 electrically charges a surface of the photosensitive drum 121, and the exposure device 123 exposes the photosensitive drum 121 to light on the basis of the image information inputted from the image recording apparatus 103 or the like.

The developing device 124 accommodates a two-component developer containing toner and a carrier and develops an electrostatic latent image into a toner image by supplying charged toner to the photosensitive drum 121. The toner image carried on the photosensitive drum 121 is transferred onto the sheet P fed from the registration roller pair 136, by a bias electric field formed by the transfer charger 125. The sheet P on which the toner image is transferred is spaced from the photosensitive drum 121 by a bias electric field formed by the separation charger 126 and then is fed toward a fixing portion 129 by a pre-fixing feeding portion 128. Incidentally, a deposited matter such as a transfer residual toner or the like remaining on the photosensitive drum 121 without being transferred onto the photosensitive drum 121 is removed by the cleaner 127, and the photosensitive drum 121 prepares for a subsequent image forming operation.

The sheet P fed to the fixing portion 129 is heated while being nipped and pressed by a roller pair, so that an image is fixed on the sheet P by melting and fixing of the toner on the sheet P. In the case where image output is completed, the sheet P on which a fixed image is obtained is discharged through a discharging roller pair 40 onto a discharge tray 130 projecting toward an outside of the printer main assembly 101A. In the case where the image is formed on a back surface of the sheet P in double-side printing, the sheet P passed through the fixing portion 129 is turned upside down by a reversing portion 139, and is fed toward the registration roller pair 136 through a feeding path 140 for the double-side printing. Then, the sheet P on which the image is formed again by the image forming portion 119 is discharged onto the discharge tray 130.

[Image Reading Apparatus]

Figure 2:
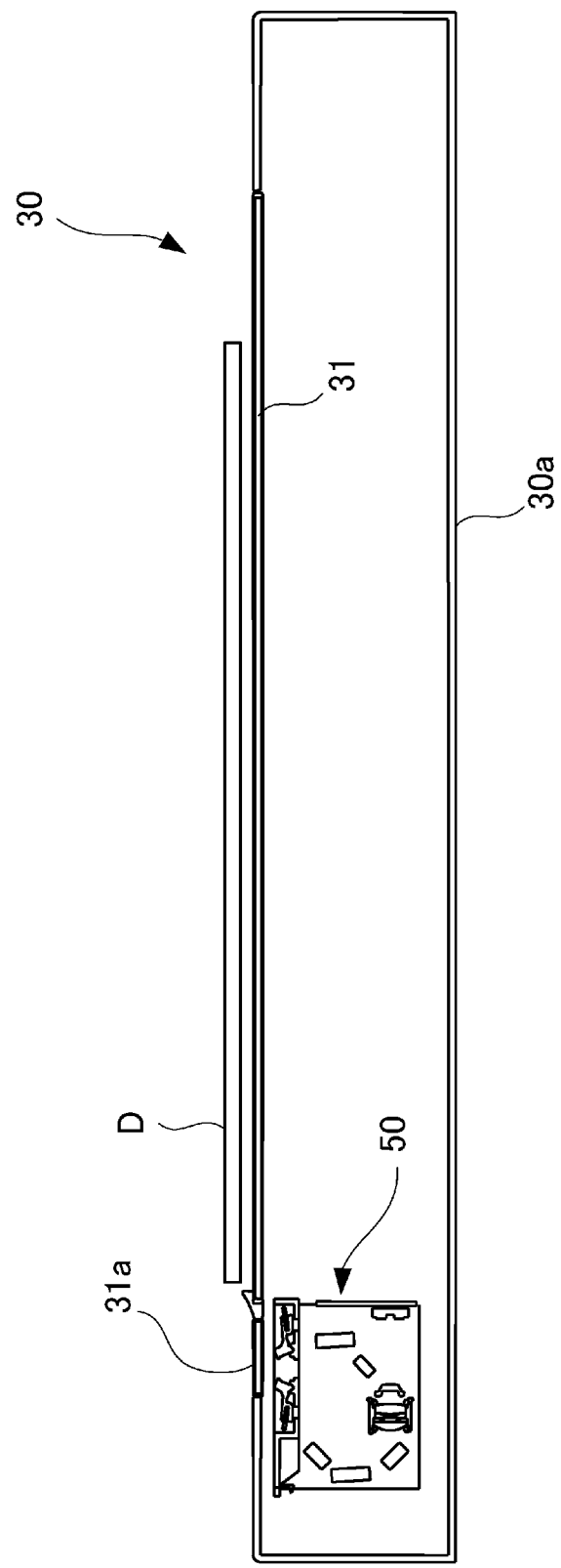
FIG. 2 is a sectional view showing a reading unit.

Next, with reference to FIGS. 1 to 3, a structure of the image recording apparatus 103 will be described. As shown in FIG. 1, the ADF 1 feeds the original D, placed on an original feeding tray 2, toward an original discharge tray 3. As regards the reading unit 30, as shown in FIG. 2, an outer casing is formed by a frame 30a, and at an upper surface of the frame 30a, an original supporting platen glass 31 and a platen glass 31a are provided. Inside the frame 30a, a scanner unit 50 is held and is configured to be movable in parallel to the original supporting platen glass 31 by an unshown wire or belt driven by a motor.

Figure 3:
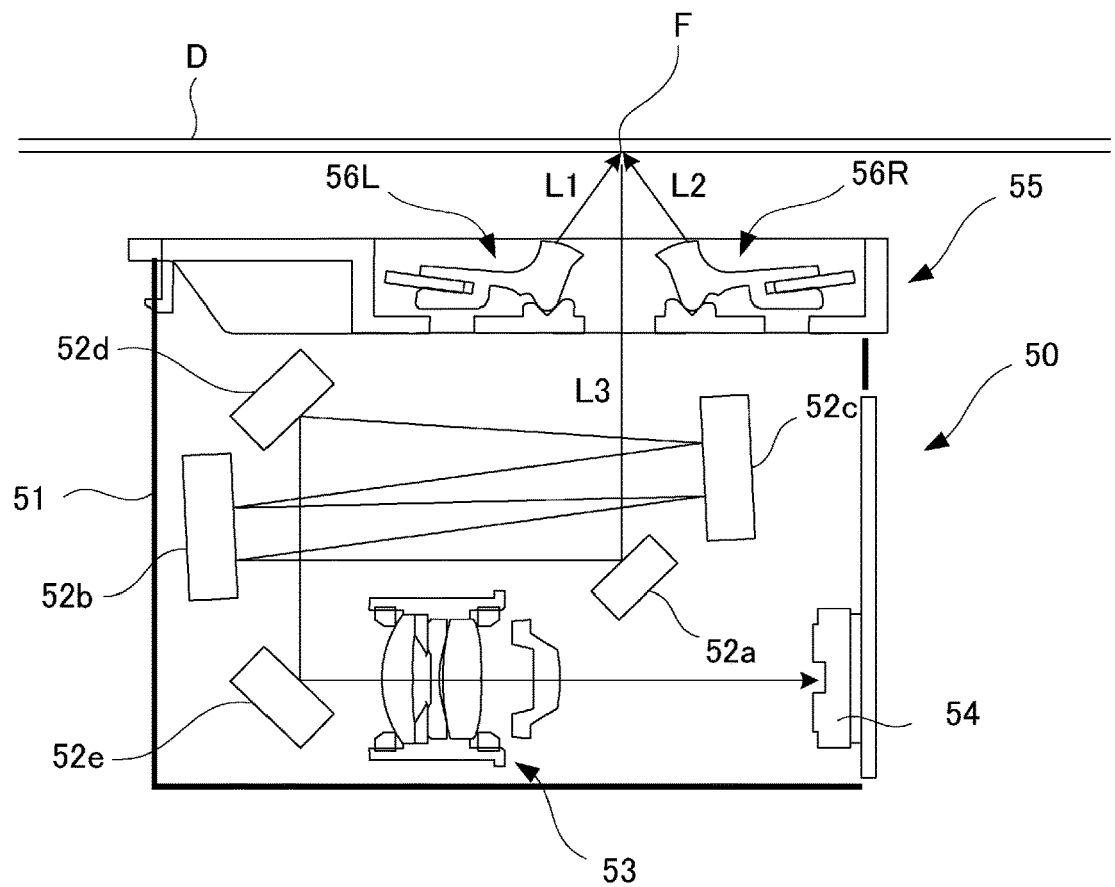
FIG. 3 is a sectional view showing a scanner unit.

The scanner unit 50 is a sensor unit of a CCD (Charge Coupled Device) type as shown in FIG. 3. Specifically, the scanner unit 50 includes a box frame 51, an illumination unit 55 mounted at an upper portion of the box frame 51, mirrors 52a, 52b, 52c, 52d and 52e, a lens unit 53 and a CCD 54.

The illumination unit 55 includes two light guiding units 56L and 56R, light L1 and L2 emitted from these light guiding units 56L and 56R, respectively, toward the original D are focused to an illumination position F set on a lower surface of the original D and then are reflected at the illumination position F by the original D. Reflected light L3 which is reflected by the original D is reflected by the mirrors 52a, 52b, 52c, 52d and 52e are passes through the lens unit 53, and then is focused on the CCD 54. The CCD 54 as an image reading portion subjects an image formed by the reflected light L3 to photoelectric conversion, and outputs, to the controller 122, an electrical signal depending on an image at the lower surface of the original D.

The thus-constituted image recording apparatus 103 reads image information from the original D in a skimming (through) mode in which an original image is scanned while feeding the original D by the ADF 1 and in a fixedly reading mode in which the original placed on the original supporting platen glass 31 is scanned. The skimming mode is selected in the case where the image recording apparatus detects the original D placed on the original feeding tray 2 or in the case where the user explicitly provides an instruction through the operating panel or the like of the printer main assembly 101A. In this case, in a state in which the scanner unit 50 is positioned below the platen glass 31a, the ADF 1 feeds the original D, placed on the original feeding tray 2, one by one. Then, scanning is carried out by illuminating the lower surface of the original D which is an image reading surface with scanning light emitted from the scanner unit 50 through the platen glass 31a. That is, the scanner unit 50 performs the image reading of the original D placed on the original supporting platen glass 31 by carrying out the scanning with respect to a sub-scan(ning) direction (left-right direction in FIG. 1).

On the other hand, the fixedly reading mode is selected in the case where the image recording apparatus detects the original D placed on the original supporting platen glass 31 or in the case where the user explicitly provides an instruction through the operating panel or the like of the printer main assembly 101A. In the case of the fixedly reading mode, first, the user opens the ADF 1 and places the original on the original supporting platen glass 31 and closes the ADF 1, so that the original is positioned relative to the original supporting platen glass 31. Then, the scanner unit 50 scans the original D placed on the original supporting platen glass 31 by illuminating the original D with light while moving along the original supporting platen glass 31. Incidentally, a scanner unit for executing an operation in the skimming mode and a scanner unit for executing an operation in the fixedly reading mode may be provided separately.

[Structure of Light Guiding Unit]

Figure 4:
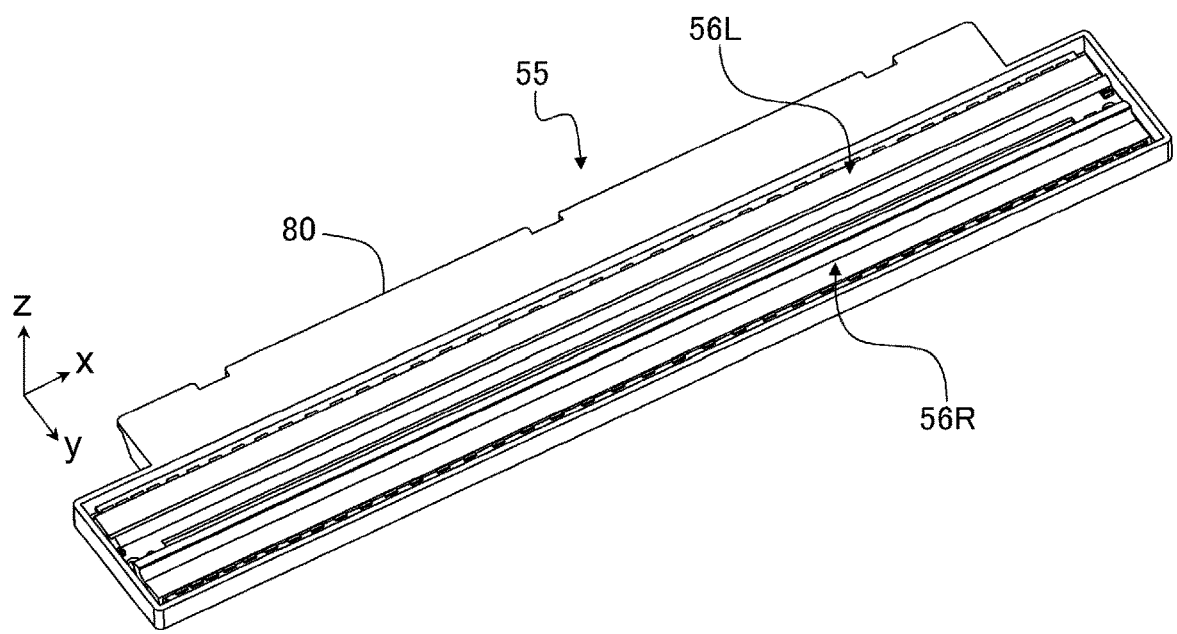
FIG. 4 is a perspective view showing an illumination unit.

The illumination unit 55 includes, as shown in FIG. 4, a base portion 80 as a supporting member on which the light guiding units 56L and 56R are mounted. The light guiding units 56L and 56R have the same structure and are disposed symmetrically with respect to the sub-scan direction. Mounting methods of the light guiding units 56L and 56R onto the base portion 80 are the same, and therefore, in the following, only the light guiding unit 56R will be described and the light guiding unit 56L will be omitted from description.

The light guiding unit 56R includes a light guide 70 as a light guiding member and an LED substrate 60 as a substrate as shown in parts (a) and (b) of FIG. 6. The LED substrate 60 includes a substrate portion 61, LEDs 62 as a plurality of light sources mounted on the substrate portion 61, and a connector portion 63 electrically connected with the plurality of LEDs 62. Here, the plurality of LEDs 62 are linearly mounted on the base portion 61 with respect to a longitudinal direction of the base portion 61, and a mounting direction thereof is the same as a main scan(ning) direction perpendicular to the above-described sub-scan direction. Further, to the plurality of LEDs 62, electric power is supplied by unshown electric wiring through the connector portion 63. A region indicated by a broken line in part (a) of FIG. 5 is an inserting portion 61a included in the substrate portion 61. In the following, the sub-scan direction which is a movement direction of the scanner unit 50 is defined as y-direction, the main scan direction is defined as x-direction, and an up-down direction perpendicular to these x-direction and y-direction is defined as z-direction.

The light guide 70 includes arcuate contact surfaces 71a and 71b formed at end portions thereof with respect to the x-direction and contactable to the base portion 80, slot portions 76, 77 and 78 for holding the LED substrate 60, and a positioning pin portion 76b to be inserted into the base portion 80. The positioning pin portion as a projected portion extends downwardly from a lower surface 76a of the slot portion 76 as a holding portion. Further, the light guide 70 has an incident surface 74 through which the light emitted from the plurality of LEDs 62 enters the light guide 70 and an outgoing (light) surface 75 through which the incident light moves toward the illumination position F (FIG. 3) of the original D. The light entering the light guide 70 through the incident surface 74 is reflected plural times inside the light guide 70, and thereafter is guided to the outgoing surface 75.

The base portion 80 includes, as shown in FIG. 6, supporting portions 81a and 81b for supporting the contact surfaces 71a and 71b, respectively, of the light guide 70, and an elongated hole portion 82 into which the positioning pin portion 76b is to be inserted. Further, the base portion 80 is provided with holes 83a, 83b and 83c through which adjusting pins 93a, 93b and 93c provided on an assembling tool 90 described later and inserted (part (a) of FIG. 9). Incidentally, as regards the base portion 80, in order to mount the light guiding unit 56R on the base portion 80, the above-described constituent elements are formed symmetrically with respect to the sub-scan direction. The base portion 80 further provided with an opening 84 for permitting passing of the reflected light L3 from the original D toward the inside of the box frame 51 and positioning holes 85a and 85b for positioning the base portion 80 relative to an upper portion of the box frame 51 and the assembling tool 90 described later.

[Mounting of LED Substrate to Light Guiding Unit]

The LED substrate 60 is, as shown in parts (a) and (b) of FIG. 7, held (supported) by inserting the inserting portion 61a (part (a) of FIG. 5) into the slot portions 76, 77 and 78 of the light guide 70.

Here, the substrate portion 61 is, as shown in part (a) of FIG. 8, provided with cut-away portions 64a and 64c formed at end portions thereof with respect to the x-direction and a cut-away portion 64b at a central portion thereof with respect to the x-direction. These cut-away portions 64a, 64b and 64c are recessed along the y-direction. When the inserting portion 61a of the LED substrate 60 is inserted into the slot portions 76, 77 and 78, the slot portion 77 engages with the cut-away portion 64b with respect to the x-direction. By this engagement, displacement of the LED substrate 60 relative to the light guide 70 in the x-direction (the main scan direction, the longitudinal direction) is prevented (limited). At this time, between the cut-away portion 64a and the slot portion 76 and between the cut-away portion 64c and the slot portion 78, sufficient intervals for preventing interference between associated portions with respect to the x-direction are provided. By heat generation due to turning-on of the LEDs 62 and thermal expansion of members with a temperature change of an external environment, a difference in displacement in the x-direction due to a difference in thermal expansion coefficient generates between the light guide 70 and the LED substrate 60 in some instances. However, by providing the above-described intervals, it is possible to prevent occurrences of warpage and distortion with propping between the light guide 70 and the LED substrate 60.

Further, as shown in part (b) of FIG. 8, when the inserting portion 61a is inserted in the slot portions 76, 77 and 78, the inserting portion 61a is sandwiched in a state in which the inserting portion 61a is press-fitted in the slot portions 76, 77 and 78. Specifically, the slot portion 76, 77 and 78 have a substantially U-shaped cross section in which one side thereof with respect to the y-direction is open, and inside the slot portions 76, 77 and 78, ribs 76c, 77c and 78c are provided, respectively. When the inserting portion 61a of the LED substrate 60 is inserted between the ribs 76c, 77c and 78c and a surface opposing these ribs, the ribs 76c, 77c and 78c are elastically deformed, so that the inserting portion 61a is sandwiched in a press-fitted state. As a result, displacement of the LED substrate 60 relative to the light guide 70 in the z-direction (up-down direction) is prevented.

Further, the LED substrate 60 is sandwiched by the slot portions 76, 77 and 78, whereby original warpage of the LED substrate 60 can be rectified. Further, the inserting portion 61a of the LED substrate 60 is inserted into the slot portions 76, 77 and 78 until the plurality of LEDs 62 contact the incident surface 74 of the light guide 70, and therefore, the LED substrate 60 is positioned relative to the light guide 70.

[Mounting of Light Guiding Unit to Base Portion]

Next, a mounting method, which is a part of a manufacturing method of the image recording apparatus 103, in which the light guiding unit 56R is mounted on the base portion 80 will be described. In this mounting method, as shown in parts (a) and (b) of FIG. 9, the assembling tool 90 is used. Incidentally, by the same method as the mounting method of the light guiding unit 56R, the light guiding unit 56L is mounted on the base portion 80.

First, the base portion 80 is fixed to the assembling tool 90. The assembling tool 90 includes a supporting table 91 for supporting the base portion 80, reference pins 92a and 92b provided on the supporting table 91, and the adjusting pins 93a, 93b and 93c provided on the supporting table 91. When the base portion 80 is fixed to the assembling tool 90, the reference pins 92a and 92b engage with the positioning holes 85a and 85b, respectively, of the base portion 80, so that the base portion 80 is positioned relative to the supporting table 91. Then, the base portion 80 is fixed to the supporting table 91 by using a means, such as fastening with a screw, capable of eliminating fixing. Further, the adjusting pins 93a, 93b and 93c are inserted into the holes 83a, 83b and 83c from below and are projected upwardly from the hole 83a, 83b and 83c.

Next, as shown in part (a) of FIG. 10, the light guiding unit 56R is mounted on the base portion 80 fixed to the assembling tool 90. At this time, first, the contact surfaces 71a and 71b of the light guide 70 are contacted to the supporting portions 81a and 81b, respectively, of the base portion 80. Here, as shown in part (b) of FIG. 10, in a yz cross-section perpendicular to the x-direction which is the longitudinal direction of the LED substrate 60, the supporting portion 81a has a V-shaped inclined surface 86a contacting, at contacts (contact points) P1 and P2 thereof, the contact surface 71a as a first contact surface of the light guide 70.

The V-shaped inclined surface 86a as a third contact surface is formed by a tangential flat surface 87a of the contact surface 71a at the contact P1 as a first contact (point) and a tangential flat surface 88a of the contact surface 71a at the contact P2 as a second contact. Further, a normal M1 to the inclined surface 86a at the contact P1 and a normal M2 to the inclined surface 86a at the contact P2 cross each other at an intersection point (point of intersection) C1 as a first intersection point.

Similarly, in a yz cross-section perpendicular to the x-direction which is the longitudinal direction of the LED substrate 60, the supporting portion 81b has a V-shaped inclined surface 86b contacting, at contacts (contact points) P3 and P4 thereof, the contact surface 71b as a second contact surface of the light guide 70.

The V-shaped inclined surface 86b as a fourth contact surface is formed by a tangential flat surface 87b of the contact surface 71b at the contact P3 as a third contact and a tangential flat surface 88b of the contact surface 71b at the contact P4 as a fourth contact. Further, a normal M3 to the inclined surface 86b at the contact P3 and a normal M4 to the inclined surface 86b at the contact P4 cross each other at an intersection point C2 as second intersection point.

Further, as shown in parts (a) and (b) of FIG. 10, an axis C passing through the intersection points C1 and C2 extends in the x-direction which is the longitudinal direction of the LED substrate 60. The contact surfaces 71a and 71b of the light guide 70 are formed in an arcuate shape with the axis C as a center, i.e., in a curved surface. By such shapes of the supporting portions 81a and 81b of the base portion 80 and the contact surfaces 71a and 71b of the light guide 70, the light guiding unit 56R is rotatably supported by the base portion 80 about the axis C extending in the x-direction. As a result, displacement of the light guiding unit 56R relative to the base portion 80 in the y-direction and the z-direction and rotation of the light guiding unit 56R relative to the base portion 80 around a y-direction axis and a z-direction axis are prevented.

Next, the positioning pin portion 76b of the light guide 70 is inserted into the elongated hole portion 82 of the base portion 80. Movement of the positioning pin portion 76b is prevented by the elongated hole portion 82 in the x-direction, and therefore, at this time, displacement of the light guiding unit 56R relative to the base portion 80 in the x-direction is prevented. Here, the positioning pin portion 76b is loosely engaged with respect to the y-direction in the elongated hole portion 82 extending in the y-direction, and therefore, the light guiding unit 56R is rotatable about the axis C as a rotational axis.

Further, lower surfaces 76a, 77a and 78a as portions-to-be-urged of the slot portions 76, 77 and 78 of the light guide 70 contact the adjusting pins 93a, 93b and 93c projected from the holes 83a, 83b and 83c of the base portion 80. Incidentally, the lower surfaces 76a, 77a and 78a of the slot portions 76, 77 and 78 not only oppose the holes 83a, 83b and 83c but also are disposed substantially in parallel to the original supporting platen glass 31. At this time, a mounting step of mounting the light guide 70 on the base portion is completed, so that rotation of the light guiding unit 56R relative to the base portion 80 about the x-direction axis is prevented. For this reason, a position and an attitude of the light guiding unit 56R relative to the base portion 80 are determined. Further, the slot portions 77 and the adjusting pin 93b are provided at the central portion with respect to the x-direction of the light guide 70, and the slot portions 76 and 78 and the adjusting pins 93a and 93c are provided at the end portions with respect to the x-direction of the light guide 70, and therefore, it is possible to rectify warpage of the light guide 70 which originally possesses from the time of molding of component parts.

Here, as described above, at the time when the light guiding units 56L and 56R are assembled with the base portion 80 fixed to the assembling tool 90, the illumination position F of the light emitted from each of the light guides is determined. Further, according to this embodiment, as shown in parts (a) and (b) of FIG. 11, by changing projection amounts of the adjusting pins 93a, 93b and 93c in the z-direction, the attitudes of the light guiding units 56L and 56R are changed, so that the illumination position F can be displaced in the z-direction. That is, the lower surfaces 76a, 76b and 76c of the light guide 70 are urged by the adjusting pins 93a, 93b and 93c, so that an angle of rotation of the light guide 70 about the axis C relative to the base portion 80 can be adjusted.

For example, as regards the attitudes of the light guiding units 56L and 56R shown in part (a) of FIG. 11, the adjusting pins 93a, 93b and 93c are further projected. As a result, the light guiding units 56L and 56R are rotated about the axis C, so that as shown in part (b) of FIG. 11, the illumination position F of the light emitted from each of the light guides can be changed to an illumination position F'. That is, by adjusting the projection amounts of the adjusting pins 93a, 93b and 93c, setting of a desired illumination position can be performed. At this time, an adjusting step of adjusting the angle of rotation of the light guide 70 relative to the base portion 80 is completed.

As regards an adjusting method (manner) of the projection amounts of the adjusting pins 93a, 93b and 93c, a constitution capable of performing stepless adjustment may be employed, and a constitution in which various adjusting pins set to provide various projection amounts are exchangeably mounted on the supporting table 91 may also be employed. Further, when the light guiding units 56L and 56R are set at a desired position and a desired attitude, each of the lower surfaces 76a, 77a and 78a of the slot portions 76, 77 and 78 may only be required so as to be substantially in parallel to an xy flat plane. As a result, even when mounting positions of the adjusting pins 93a, 93b and 93c on the supporting table 91 with respect to the x-direction and the y-direction, positions where the adjusting pins 93a, 93b and 93c contact the lower surfaces 76a, 77a and 78a are not displaced in the z-direction. For this reason, the influence thereof on the attitudes of the light guiding units 56L and 56R is small.

Finally, in a state in which the determination of the position and attitude of the light guiding units 56L and 56R relative to the base portion 80 is made, the light guiding units 56L and 56R are bonded to the base portion with an ultraviolet (UV) adhesive (UV bonding). Here, UV bonding positions ("UV") are, as shown in FIG. 12, set at portions where the contact surfaces 71a and 71b are supported and in a gap between the LED substrate 60 and the base portion 80.

Incidentally, the UV bonding positions in the gap between the LED substrate 60 and the base portion 80 may desirably be a plurality of positions with respect to the x-direction. As a result, a fixing step of fixing, to the base portion 80, the light guide 70 of which angle of rotation is adjusted. Incidentally, the UV bonding is a method in which an UV curable resin material used as an adhesive is cured by UV radiation and the light guide 70 is bonded to the base portion 80 is not limited to the UV bonding, but another fixing method such as bonding with an adhesive using no UV curable resin material, compression (bonding), thermal bonding or fastening with screw(s) may also be used.

After the UV bonding is made, the base portion 80 into which the light guiding units 56L and 56R are assembled is dismounted from the assembling tool 90, and as an illumination unit 55, the base portion 80 is mounted at an upper portion of the box frame 51 by using the positioning holes 85a and 85b (FIGS. 2 and 6).

As described above, according to this embodiment, when the illumination unit 55 is assembled, the attitudes of the light guiding units 56L and 56R are changed using the assembling tool 90 provided with the adjusting pins 93a, 93b and 93c, so that setting of a desired illumination position is enabled. As a result, the need of component parts such as a sheet member used for adjusting the positions and attitudes of the light guiding units 56L and 56R is eliminated, so that it becomes possible to perform the positioning, the determination of attitude and support of the light guiding units 56L and 56R with a necessary minimum number of component parts. For that reason, it is possible to reduce a cost of the component parts, the number of assembling steps and an assembly cost.

Further, the number of component parts is small, and therefore, the influence of an integrated component part tolerance on the positions and attitudes of the light guiding units 56L and 56R can be reduced, so that positional accuracy of the light guide 70 and the illumination position F can be improved. Further, a constitution in which setting of the illumination position F is performed using the high-precision adjusting pins 93a, 93b and 93c is employed, and therefore, improper illumination due to positional deviation of the illumination position F can also be reduced. Further, the attitudes of the light guiding units 56L and 56R are changed by rotating the light guide 70 about the axis C extending in parallel to the longitudinal direction of the LED substrate 60, so that a line light source extending in the sub-scan direction at the illumination position F can be easily prepared.

Further, in some cases, the image recording apparatus 103 including the ADF 1 as in this embodiment and an image recording apparatus which does not include the ADF 1 and which is capable of performing only the fixedly reading are different in proper illumination position F. However, as in this embodiment, by employing the constitution in which the setting of the illumination position F is performed using the assembling tool 90 including the adjusting pins 93a, 93b and 93c, commonality of component parts constituting the illumination unit 55 can be achieved.

Second Embodiment

Next, Second Embodiment of the present invention will be described, but in Second Embodiment, the V-shaped inclined surface 86a formed at the base portion 80 in First Embodiment is changed to an arcuately curved surface. For this reason, constituent elements similar to those in First Embodiment will be described by omitting illustration thereof or by adding the same reference numerals or symbols to FIG. 13.

A light guide 170 as a light guiding member includes, as shown in FIG. 13, arcuate contact surfaces 171a and 171b as first and second contact surfaces with an axis C as a center in yz cross-section. Further, supporting portions 181a and 181b of a base portion 80 includes arcuate surfaces 186a and 186b, respectively, as third and fourth contact surfaces with the axis C as the center in the yz cross-section.

The arcuate contact surfaces 171a and 171b and the arcuate surfaces 186a and 186b continuously contact each other, respectively, in their arcuate shapes. For example, the contact surface 171a contacts the arcuate surface 186a at contacts P1 and P2, and the contact surface 171b contacts the arcuate surface 186b at contacts P3 and P4. Further, a normal M1 to the arcuate surface 186a at the contact P1 and a normal M2 to the arcuate surface 186a at the contact Ps cross each other at an intersection point C1. Similarly, a normal M3 to the arcuate surface 186b at the contact P3 and a normal M4 to the arcuate surface 186b at the contact P4 cross each other at an intersection point C2.

Further, the axis C passing through the intersection points C1 and C2 extends in the x-direction which is the longitudinal direction of the LED substrate 60, and a light guiding unit 156R is rotatably supported by a base portion 180 about the axis C extending in the x-direction. Incidentally, a mounting method of the light guiding unit 156R on the base portion 180 is similar to that in First Embodiment.

By employing the above-described constitution, it becomes possible to easily perform setting of the illumination position F by rotating the light guiding unit 156R about the axis C. As a result, it becomes possible to perform the positioning, the determination of attitude and support of the light guiding unit 156R with a necessary minimum number of component parts. For that reason, it is possible to not only reduce a cost of the component parts, the number of assembling steps and an assembly cost but also improve positional accuracy of the light guide 170 and the illumination position F.

Third Embodiment

Next, Third Embodiment of the present invention will be described, but in Third Embodiment, the supporting structure of the light guide 70 by the base portion 80 in First Embodiment is changed. For this reason, constituent elements similar to those in First Embodiment will be described by omitting illustration thereof or by adding the same reference numerals or symbols to FIG. 13.

A light guide 270 as a light guiding member includes, as shown in FIG. 14, first and second shaft portions 271a and 271b extending in parallel to the x-direction which is the longitudinal direction of the LED substrate 60. The first and second shaft portions 271a and 271b project from end portions, respectively, of the light guide 270 with respect to the x-direction, and outer peripheral surfaces of these first and second shaft portions 271a and 271b constitute first and second contact surfaces, respectively. Further, a base portion 280 includes a frame 289 standing in the z-direction, and the frame 289 is provided with supporting portions 281a and 281b having third and fourth contact surfaces, respectively, each comprising a U-shaped groove.

The first and second shaft portions 271a and 271b are rotatably supported by the supporting portions 281a and 281b, respectively, and axis center lines of the first and second shaft portions 271a and 271b align with the axis C. Incidentally, a positional relationship of the axis C with contacts between the first and second shaft portions 271a and 271b and the supporting portions 281a and 281b is substantially the same as a corresponding positional relationship in Second Embodiment and therefore will be omitted from description.

By employing the above-described constitution, it becomes possible to easily perform setting of the illumination position F by rotating a light guiding unit 256R about the axis C. As a result, it becomes possible to perform the positioning, the determination of attitude and support of the light guiding unit 256R with a necessary minimum number of component parts. For that reason, it is possible to not only reduce a cost of the component parts, the number of assembling steps and an assembly cost but also improve positional accuracy of the light guide 270 and the illumination position F.

Incidentally, the contact surfaces of the light guides in First and Second Embodiments and the first and second shaft portions of the light guide in Third Embodiment which are described above includes the arcuately curved contact surfaces, but the present invention is not limited thereto. That is, in order to rotatably support the light guide about the axis C by the base portion, at least one of the light guide and the base portion may only be required to be formed in an arcuate shape about the axis C. For example, in Second Embodiment, the contact surfaces 171a and 171b of the light guide 170 may also be formed in a rectangular shape in the yz cross-section. Further, an example in which the light guide and/or the base portion is formed in the arcuate shape about the axis C was described, but is not necessarily be formed in the arcuate shape about the axis C. At least one of the contact surfaces of the light guide and the base portion may only be required to be a curved surface in the yz cross-section so as to be rotatable when the light guide is mounted on the base portion.

Further, in either of the above-described embodiments, the two light guiding units were provided, but a single light guiding unit or three or more light guiding units may also be provided. Further, the slot portions formed in the light guide are formed in the substantially U-shape in cross-section, but the present invention is not limited thereto. Further, the three slot portions and the three adjusting pins are provided, but the numbers of the slot portions and the adjusting pins may also be one, two or four or more.

Further, also in either of the above-described embodiments, the image recording apparatus 103 is not limited to the image recording apparatus including the ADF 1 but may also be an image recording apparatus including only a pressing plate by which the original is pressed against the original supporting platen glass 31 from above.

Further, also in either of the above-described embodiments, description was made using the printer 101 of an electrophotographic type, but the present invention is not limited thereto. For example, the present invention is also applicable to an image forming apparatus of an ink jet type in which an image is formed on a sheet by ejecting an ink liquid through nozzles. Further, also in either of the above-described embodiments, an example in which the scanner unit 50 includes the illumination unit 55 and the CCD 54 was described, but the present invention is not limited to this example. A constitution in which a unit moving the sub-scan direction is only the illumination unit 55 and light reflected from an original is guided by mirrors toward photoelectric conversion elements such a fixed CMOS sensor or the like may also be employed.

In the above, various embodiments were described, but the present invention is not limited to the above-described embodiments. The present invention can be variously improved or changed within the scope of the present invention. When the light guide is configured to be rotatably adjustable relative to the base portion, effects of the present invention can be achieved. According to the present invention, positional adjustment of the light guiding member can be easily carried out.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-035076 filed on Feb. 28, 2018, which is hereby incorporated by reference herein in its entirety.

What is claimed is:

1. An image reading device comprising:
a light source configured to emit light;
a light guiding member configured to guide light emitted from the light source to a sheet and including a first portion and second portion, wherein the second portion is provided at a position different from a position where the first portion is provided in a longitudinal direction of the light guiding member;
a supporting member including a first concave portion provided on a position corresponding to the first portion and a second concave portion provided on a position corresponding to the second portion, and configured to support the light guiding member in a state in which the first portion is engaged with the first concave portion and the second portion is engaged with the second concave portion; and
an image reading element configured to read image on the sheet by receiving light which is guided by the light guiding member supported by the supporting member and is reflected by the sheet,
wherein in a cross section crossing the longitudinal direction, at least one of or more than one of a surface of the first portion which contacts a surface of the first concave portion and the surface of the first concave portion is a curved surface, and
wherein in the cross section crossing the longitudinal direction, at least one of or more than one of a surface of the second portion which contacts a surface of the second concave portion and the surface of the second concave portion is a curved surface.

2. An image reading device according to claim 1, wherein the first portion is bonded to the first concave portion, and the second portion is bonded to the second concave portion.

3. An image reading device according to claim 1, wherein the light guiding member includes a projected portion projected toward the supporting member, and
wherein the supporting member includes an elongated hole portion into which the projected portion is inserted,
wherein the light guiding member is supported by the supporting member in a state in which the projected portion is inserted into the elongated hole portion.

4. An image reading device according to claim 3, further comprising a substrate on which the light source is provided,
wherein the light guiding member includes a holding portion configured to hold the substrate, and
wherein the projected portion is projected from a lower surface of the holding portion.

5. An image reading device according to claim 1, wherein in the cross-section crossing the longitudinal direction, the first concave portion contacts the first portion at a first contact position and a second contact position,
wherein in the cross-section crossing the longitudinal direction, the second concave portion contacts the second portion at a third contact position and a fourth contact position.

6. An image reading device according to claim 5,
wherein in the cross section crossing the longitudinal direction, each of the surface of the first portion and the surface of the second portion is the curved surface,
wherein an axis passing through a first intersection point and a second intersection point extends in parallel to the longitudinal direction, the first intersection point being as an intersection point between a normal to the first portion at the first contact position and a normal to the first portion at the second contact position in the cross-section crossing the longitudinal direction, and the second intersection point being as a second intersection point between a normal to the second portion at the third contact position and a normal to the second portion at the fourth contact position in the cross-section crossing the longitudinal direction,
wherein in the cross-section crossing the longitudinal direction, each of the first portion and the second portion is formed in an arcuate shape about the axis.

7. An image reading device according to claim 5,
wherein in the cross section crossing the longitudinal direction, each of the first portion and the second portion is the curved surface,
wherein the first concave portion is formed by a tangential flat surface at the first contact position and by a tangential flat surface at the second contact position, and
wherein the second concave portion is formed by a tangential flat surface at the third contact position and by a tangential flat surface at the fourth contact position.

8. An image reading device according to claim 5, wherein in the cross section crossing the longitudinal direction, each of the surface of the first concave portion and the surface of the second concave portion is the curved surface,
wherein an axis passing through a first intersection point and a second intersection point extends in parallel to the longitudinal direction, the first intersection point being as an intersection point between a normal to the first concave portion at the first contact position and a normal to the first concave portion at the second contact position in the cross-section crossing the longitudinal direction, and the second intersection point being as a second intersection point between a normal to the second concave portion at the third contact position and a normal to the second concave portion at the fourth contact position in the cross-section crossing the longitudinal direction,
wherein in the cross-section crossing the longitudinal direction, each of the first concave portion and the second concave portion is formed in an arcuate shape about the axis.

9. An image reading device according to claim 1, wherein in the cross section crossing the longitudinal direction, each of the surface of the first portion and the surface of the second portion is the curved surface.

10. An image forming apparatus comprising:
an image recording device including,
a light source configured to emit light;

a light guiding member configured to guide light emitted from the light source to a sheet and including a first portion and second portion, wherein the second portion is provided at a position different from a position where the first portion is provided in a longitudinal direction of the light guiding member;

a supporting member including a first concave portion provided on a position corresponding to the first portion and a second concave portion provided on a position corresponding to the second portion, and configured to support the light guiding member in a state in which the first portion is engaged with the first concave portion and the second portion is engaged with the second concave portion; and an image reading element configured to read image on the sheet by receiving light which is guided by the light guiding member supported by the supporting member and is reflected by the sheet, and an image forming portion configured to form, on the sheet, an image read by the image recording device, wherein in a cross section crossing the longitudinal direction, at least one of or more than one of a surface of the first portion which contacts a surface of the first concave portion and the surface of the first concave portion is a curved surface, and wherein in the cross section crossing the longitudinal direction, at least one of or more than one of a surface of the second portion which contacts a surface of the second concave portion and the surface of the second concave portion is a curved surface.

11. An image reading device according to claim 1, wherein in the cross section crossing the longitudinal direction, each of the surface of the first concave portion and the surface of the second concave portion is the curved surface.

* * * * *